3,496,175
SUBSTITUTED IMIDAZOTRIAZINES
Marcel K. Eberle, Madison, N.J., assignor to Sandoz-Wander, Inc., Hanover, N.J., a corporation of Delaware
No Drawing. Filed Oct. 18, 1967, Ser. No. 676,083
Int. Cl. C07d 57/34
U.S. Cl. 260—249.5                15 Claims

ABSTRACT OF THE DISCLOSURE

This disclosure pertains to imidazo[2,1-c]as-triazines, e.g., 1-methyl-3 - (p-chlorophenyl) - 1,4,6,7 - tetrahydro-imidazo-[2,1-c]as-triazine. These compounds are useful as central nervous system stimulants.

---

This invention pertains to novel heterocyclic compounds and more particularly to novel substituted imidazotriazines. Still more particularly, this invention relates to 3-phenyl and substituted phenyl-tetrahydroimidazo[2,1-c]as-triazines, intermediates therefor, and their methods of preparation.

The compounds of this invention may be represented by the formula:

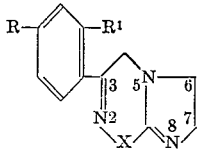

(I)

where:

X is N-loweralkyl or NH;
R is H, loweralkoxy, chloro or fluoro; and
$R_1$ is H or chloro;

provided that when $R_1$ is chloro, R is chloro.

The loweralkyl and loweralkoxy groups mentioned herein are straight chain radicals having 1–4 carbon atoms, e.g., methyl, ethyl, propyl, methoxy, ethoxy, and the like.

The triazines represented by Formula I above are prepared by treating an appropriately substituted loweralkyl-thio imidazolinyl acetophenone with hydrazine or a loweralkyl hydrazine. The process for preparing these triazines (I) may be illustrated by the following flow diagram:

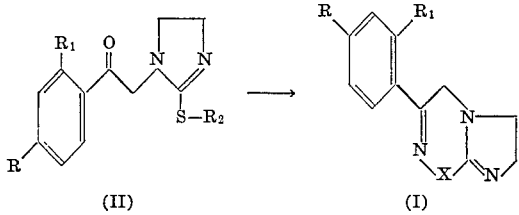

wherein R, $R_1$, and X are as defined above and $R_2$ represents lower alkyl.

In accordance with the process described hereinabove, compound (II) is treated with hydrazine or a loweralkyl hydrazine at temperatures of about 20° to about 100° C. Room temperature is preferred because of convenience. Solvent may be used but is not critical in obtaining the desired product, and excess hydrazine or lower alkyl hydrazine may be used in lieu of solvent. Dimethylformamide, alcohols, dimethylsulfoxide and water are illustrative of solvents which may be used. The reaction is allowed to proceed for about ½ to 24 hours. Although particular reaction temperatures have been indicated above, they are not critical to the successful completion of this method. The imidazotriazines of Formula I are readily recovered by conventional techniques.

The substituted acetophenones of Formula II may be prepared as represented by the following reaction scheme:

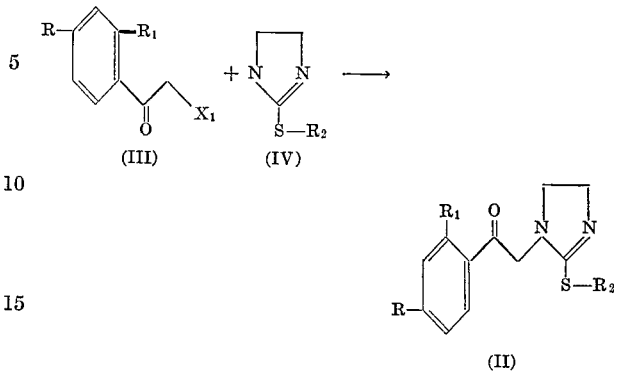

where X, R, $R_1$, and $R_2$ are as defined above and $X_1$ represents chloro or bromo. This process step may be carried out at 20° to 100° C. and here also room temperature is preferred because of convenience. This reaction may be carried out in solvent such as dimethylsulfoxide, dimethylformamide, acetone and alcohols such as loweralkanols. The reaction appears to progress more efficiently in dimethylformamide and this solvent is accordingly preferred. Neither the solvent nor the temperature of reaction are critical in obtaining the substituted acetophenones (II). When desired, the products (II) need not be isolated and these compounds may be used directly in obtaining the triazines of Formula I.

The compounds of Formula II and some of the compounds of Formula I are normally recovered as the hydrogen halide salts, i.e., the bromide or chloride. When it is desired in such instance to obtain the free base, the salt may be converted thereto using conventional methods, as by dissolution in water and precipitation with a base, e.g., sodium hydroxide.

Various of the 2-halo-substituted acetophenones (III) and 2-loweralkylthioimidazolines (IV) utilized as starting materials are known and are prepared by methods described in the literature. Those starting materials not specifically described in the literature may be prepared from available materials by analogous methods.

Some of the compounds of Formula I, and more specifically those having no lower alkyl group attached at the 1-position, may exist as the tautomer as follows:

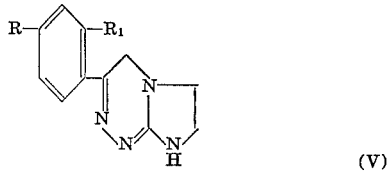

(V)

wherein R and $R_1$ are as previously defined. For simplicity, reference is being made only to the compound designated as Formula I, but it should be understood that either of the tautomers may be represented, and all are included in this invention.

The compounds represented by Formula I above are useful because they possess pharmacological properties in animals, such as mammals, e.g., primates. In particular, these compounds are useful as central nervous system stimulants, e.g., antidepressants and psychic energizers, as indicated by their activity in mice tested according to the 30 word adjective check sheet system basically as described by S. Irwin (Gordon Research Conference, Medicinal Chemistry, 1959) and Chen (Symposium on Sedative and Hypnotic Drugs, Williams and Wilkins, 1954). When so utilized, the compounds may be combined with one or more pharmaceutically acceptable carriers or adjuvants. They may be administered orallly or parenterally and, depending upon the compound employed and the mode of administration, the exact dosage utilized may vary. Furthermore, these compounds may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like. In general, satisfactory results are obtained when these compounds are administered at a daily dosage of about 1 milligram to about 50 milligrams per kilogram of animal body weight. This daily dosage is preferably administered 2 to 4 times a day, or in sustained release form. For most large mammals, the total daily dosage is from about 100 milligrams to about 300 milligrams. Dosage forms suitable for internal use comprise from about 25 milligrams to about 150 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by wt. |
|---|---|
| 3-(2',4'-dichlorophenyl) - 4,6,7,8 - tetrahydroimidazo[2,1-c]as-triazine | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

Step 1.—4'-chloro-2-(2-methylthio-2-imidazolin-1-yl)acetophenone hydrobromide

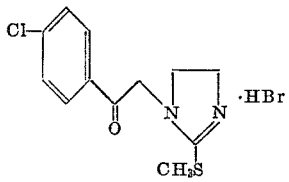

To 2-bromo-4'-chloro-acetophenone (14 g.) in 25 ml. of anhydrous dimethylformamide is added 7 g. of 2-methylthioimidazoline with stirring. An exothermic reaction takes place (ca. 50° C.) and stirring is continued for about one hour to provide 4'-chloro-2-(2-methylthio-2-imidazolin-1-yl) acetophenone hydrobromide. The product is filtered off and dissolved in hot water (500 ml.), filtered and the filtrate evaporated to dryness in vacuo. The residue is dissolved in 300 ml. of anhydrous ethanol and precipitated with anhydrous ether to provide 14.6 g. of 4'-chloro-2-(2-methylthio - 2 - imidazolin-1-yl)acetophenone hydrobromide; M.P. 221°-222° C.

Step 2.—1-methyl-3-(p-chlorophenyl)-1,4,6,7-tetrahydro-imidazo[2,1-c]-as-triazine

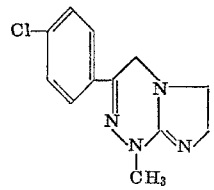

4'-chloro-2-(2-methylthio - 2 - imidazolin-1-yl)acetophenone hydrobramide (14.7 g.) is dissolved in 20 ml. of anhydrous dimethylformamide. The solution is stirred at room temperature and 8 g. of methylhydrazine is added. An exothermic reaction takes place. The mixture is evaporated to dryness in vacuo to leave 20 g. of crude material which is recrystallized from ethanol to give the hydrobromide salt of 1-methyl-3-(p-chlorophenyl)-6,7-dihydro - 1H,4H - imidazo-[2,1-c]as-triazine; M.P. 282–284° C. The free base is prepared from the hydrobromide by adding the salt to 50 ml. of 2 N sodium hydroxide and extracting with chloroform (50 ml.). After recrystallizing once from 50 ml. acetone with hexane, there is obtained 5.7 g. of 1-methyl-3-(p-chlorophenyl)-1,4,6,7-tetrahydroimidazo[2,1-c]-as-triazine.

In addition to having the CNS stimulant activity discussed above, this compound has been found useful as an analgesic and anti-inflammatory in mouse and rat, respectively. It may be administered in the same manner and in the same dosages as for the previously discussed use, except that the maximum daily dosage for animals should be about 25 mg./kg.

When the free base is dissolved in anhydrous ethanol and hydrogen chloride gas is passed into the solution, the hydrochloride salt precipitates upon addition of anhydrous ether; M.P. 295–297° C.

EXAMPLE 2

3-(p-chlorophenyl)-4,6,7,8-tetrahydroimidazo[2,1-c]-as-triazine

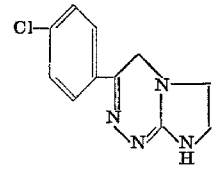

2-bromo-4'-chloro-acetophenone (10 g.) and 5 g. of 2-methylthioimidazoline are mixed and stirred at room temperature in 20 ml. of anhydrous dimethylformamide. An exothermic reaction takes place (about 50° C.) with stirring for one hour. The solution is cooled to room temperature and some 4'-chloro-2-(2-methylthio-2-imidazolin-1-yl)acetophenone hydrobromide precipitates. 6 ml. of hydrazine (97%) is added and exothermic reaction is observed (about 60° C.). The product, 3-(p-chlorophenyl)-4,6,7,8-tetrahydroimidazo[2,1-c]-as-triazine, precipitates immediately, and is filtered after one hour (8 g.); M.P. 264–265° C. The hydrochloric acid addition salt has a melting point of 222–223° C.

EXAMPLE 3

3-(p-methoxyphenyl)-4,6,7,8-tetrahydroimidazo[2,1-c]-as-triazine

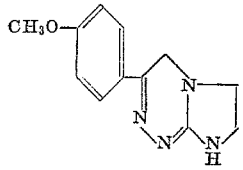

10 g. of 2-bromo-4'-methoxy acetophenone is added to 5 g. of 2-methylthioimidazoline in 20 ml. of anhydrous dimethylformamide. An exothermic reaction is allowed to proceed with stirring for about one hour to provide 4'-methoxy - 2 - (2 - methylthio-2-imidazolin-1-yl)acetophenone hydrobromide. Hydrazine is added (97%, 6 ml.) to the solution at room temperature. The product, 3 - (p-methoxyphenyl)-4,6,7,8-tetrahydroimidazo[2,1-c]-as-triazine, precipitates (6 g.); M.P. 258–260° C. The hydrochloric acid addition salt melts at 255–258° C.

EXAMPLE 4

Step 1.—2(2-methylthio-2-imidazolin-1-yl)acetophenone hydrobromide

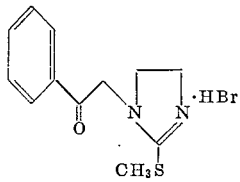

To 2-bromoacetophenone (17.2 g.) in 20 ml. of anhydrous dimethylformamide is added 10 g. of 2-methylthioimidazoline. An exothermic reaction is observed, and after 2 hours the reaction mixture is evaporated to dryness, dissolved in 200 ml. of warm water and filtered. The filtrate is evaporated to dryness in vacuo. The residue is dissolved in 300 ml. of anhydrous ethanol and treated with anhydrous ether to obtain 2(2-methylthio-2-imidazolin-1-yl)acetophenone hydrobromide (18 g.); M.P. 177–179° C.

Steps 1 and 2.—3-phenyl-4,6,7,8-tetrahydroimidazo [2,1-c]-as-triazine

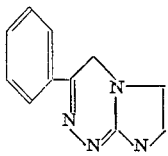

Using the same procedure as in Example 3 and starting with 8.6 g. of 2-bromoacetophenone and 5.0 g. of 2-methylthioimidazoline, there is obtained 8 g. of crude product which, after recrystallization from ethanol, provides 6 g. of 3-phenyl-4,6,7,8-tetrahydroimidazo [2,1-c]-as-triazine; M.P. 228–230° C. The hydrochloric acid addition salt has a melting point of 287° C.

EXAMPLE 5

Step 1.—2',4'-dichloro-2(2-methylthio-2-imidazolin-1-yl) acetophenone hydrobromide

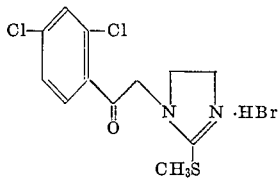

To 2-bromo-2',4'-dichloroacetophenone (26 g.) in 50 ml. of anhydrous dimethylformamide is added 11 g. of 2-methylthioimidazoline with stirring. An exothermic reaction takes place (about 60° C.) and stirring is continued for about one hour. 100 ml. of anhydrous ethanol is added to the reaction mixture and anhydrous ether is slowly added to precipitate crude 2',4'-dichloro-2(2-methylthio-2-imidazolin-1-yl) acetophenone hydrobromide; M.P. 187–188° C. When the above process is carried out using 2-chloro-2',4'-dichloroacetophenone in place of 2-bromo-2', 4'-dichloroacetophenone, the same product is again obtained.

Step 2.—3-(2',4'-chlorophenyl)-4,6,7,8-tetrahydroimidazo [2,1-c]-as-triazine

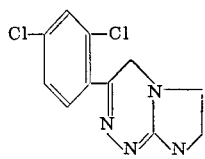

To 6 g. of 2',4'-dichloro(2-methylthio-2-imidazolin-1-yl)acetophenone hydrobromide dissolved in 30 ml. of dimethylformamide is added 3 g. of hydrazine. The reaction mixture is evaporated to dryness in vacuo. Water (50 ml.) and then 10 ml. of 2 N sodium hydroxide are added and 3 - (2',4' - chlorophenyl) - 4,6,7,8 - tetrahydroimidazo [2,1-c]-as-triazine precipitates, 4.1 g.; M.P. 194–197° C.

EXAMPLE 6

1-methyl-3(2',4'-dichlorophenyl)-1,4,6,7-tetrahydroimidazo[2,1-c]-as triazine

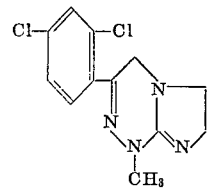

When the process of Example 5, step 2 is carried out and 3 g. of methyl hydrazine is added in place of hydrazine, and the product is worked up using 25 ml. of water and 20 ml. of 2 N sodium hydroxide, after sublimation there is obtained 1-methyl-3(2',4'-dichlorophenyl)-1,4,6,7-tetrahydroimidazo[2,1-c]-as-triazine (2.8 g.); M.P. 103°–105° C.

EXAMPLE 7

Step 1.—4'-fluoro-2(2-methylthio-2-imidazolin-1-yl) acetophenone hydrobromide

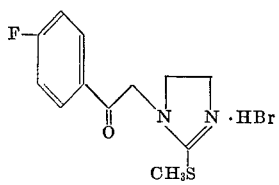

2-bromo-4'-fluoroacetophenone (22 g.) in 50 ml. of anhydrous dimethylformamide is admixed with 11.6 g. of 2-methylthioimidazoline. An exothermic reaction takes place (about 60° C.) and stirring is continued for about one hour. Anhydrous ethanol (100 ml.) is added and the hydrobromide salt (crude) of 4'-fluoro-2(2-methylthio-2-imidazolin-1-yl)acetophenone is precipitated from the reaction mass by slow addition of anhydrous ether. The crude material is dissolved in 110 ml. of ethanol and recrystallized to provide 14.5 g. of 4'-fluoro-2(2-methylthio-2-imidazolin-1-yl)acetophenone hydrobromide; M.P. 204–206° C. When the above process is carried out using 2-chloro-4'-fluoroacetophenone in place of 2-bromo-4'-fluoroacetophenone, the same product is again obtained.

Step 2.—3-(4'-fluorophenyl)-4,6,7,8-tetrahydroimidazo [2,1-c]-as-triazine

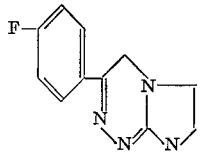

To 4.7 g. of 4'-fluoro(2'-methylthio-2-imidazolin-1-yl) acetophenone hydrobromide suspended in 25 ml. of absolute dimethylformamide is added 2.5 g. of hydrazine. An exothermic reaction is observed and is allowed to continue for two hours. The reaction mixture is evaporated to dryness in vacuo, water (50 ml.) and then 10 ml. of 2 N sodium hydroxide are added and 3-(4'-fluorophenyl)-4,6, 7,8-tetrahydroimidazo[2,1-c]-as-triazine precipitates. This material is recrystallized from 25 ml. of hot methanol to provide relatively pure product having an M.P. of 253–256° C.

EXAMPLE 8

1-methyl-3(4'-fluorophenyl)-1,4,6,7-tetrahydroimidazo[2,1-c]-as-triazine

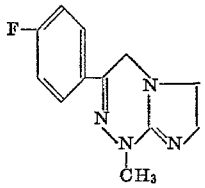

When the process of Example 7, step 2 is carried out and 2.5 g. of methyl hydrazine is added to the suspension of substituted acetophenone in dimethylformamide, there is obtained 1 - methyl - 3(4' - fluorophenyl)-1,4,6,7-tetrahydroimidazo[2,1-c]as-triazine; M.P. 269–271° C. This product is obtained after recrystallization using 50 ml. of ethanol and anhydrous ether.

What is claimed is:

1. A compound of the formula

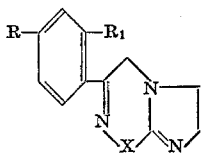

or the non-toxic pharmaceutically acceptable acid addition salts thereof, where:

X is N-lower alkyl or NH;
R is H, lower alkoxy, fluoro or chloro; and
$R_1$ is H or chloro;

provided that when $R_1$ is chloro, R is chloro.

2. The compound according to claim 1 which is 1-methyl - 3(p - chlorophenyl) - 1,4,6,7 - tetrahydroimidazo[2,1-c]-as-triazine.

3. The compound according to claim 1 which is 3-(p-chlorophenyl) - 4,6,7,8 - tetrahydroimidazo[2,1-c]-as-triazine.

4. The compound according to claim 1 which is 3-(p-methoxyphenyl) - 4,6,7,8 - tetrahydroimidazo[2,1-c]-as-triazine.

5. The compound according to claim 1 which is 3-phenyl-4,6,7,8-tetrahydroimidazo[2,1-c]-as-triazine.

6. The compound according to claim 1 which is 3-(2', 4' - dichlorophenyl)-4,6,7,8-tetrahydroimidazo[2,1-c]-as-triazine.

7. The compound according to claim 1 which is 3-(4'-fluorophenyl) - 4,6,7,8 - tetrahydroimidazo[2,1-c]-as-triazine.

8. The compound according to claim 1 which is 1-methyl-3(4'-fluorophenyl) - 1,4,6,7 - tetrahydroimidazo[2,1-c]-as-triazine.

9. The compound according to claim 1 which is 1-methyl-3(2,4'-dichlorophenyl) - 1,4,6,7 - tetrahydroimidazo[2,1-c]-as-triazine.

10. A compound having the formula

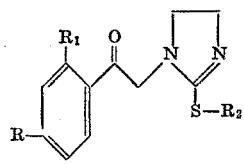

or hydrogen halide addition salts thereof, where:

R is H, lower alkoxy, fluoro or chloro;
$R_1$ is H or chloro; and
$R_2$ is lower alkyl;

provided that when $R_1$ is chloro, R is chloro.

11. The compound according to claim 10 which is 4'-chloro-2(2-methylthio-2-imidazolin-1-yl)acetophenone.

12. The compound according to claim 10 which is 2', 4'-dichloro - 2(2 - methylthio - 2 - imidazolin-1-yl)acetophenone.

13. The compound according to claim 10 which is 4'-fluoro-2(2-methylthio-2-imidazolin-1-yl)acetophenone.

14. The compound according to claim 10 which is 2(2-methylthio-2-imidazolin-1-yl)acetophenone.

15. A process for preparing a compound of claim 1 which comprises treating a compound of the formula:

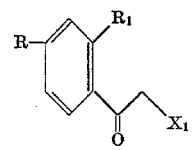

with a compound of the formula

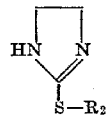

to provide an intermediate of the formula

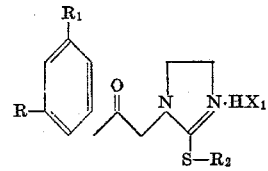

and treating said intermediate or the free base thereof with hydrazine or a lower alkyl hydrazine, where:

X is N-lower alkyl or NH;
R is H, lower alkoxy, fluoro or chloro;
$R_1$ is H or chloro;
$R_2$ is lower alkyl; and
$X_1$ is chloro or bromo;

provided that when $R_1$ is chloro, R is chloro.

References Cited

UNITED STATES PATENTS

| | | | |
|---|---|---|---|
| 2,981,739 | 4/1961 | Bimber | 260—309.6 |
| 3,190,887 | 6/1965 | Hensley et al. | 260—309.6 |
| 3,334,112 | 8/1967 | Wright et al. | 260—309.6 |
| 3,422,194 | 1/1969 | Loev | 260—249.5 |

OTHER REFERENCES

Werbel et al., J. Heterocyclic Chem., vol. 2, pp. 287–90 (1965).

HENRY R. JILES, Primary Examiner

J. M. FORD, Assistant Examiner

U.S. Cl. X.R.

260—309.6; 424—249